Sept. 30, 1930.   G. JAEGER   1,777,168

CLUTCH

Filed Nov. 16, 1926

Inventor
GEBHARD JAEGER his Attorneys

Patented Sept. 30, 1930

1,777,168

UNITED STATES PATENT OFFICE

GEBHARD JAEGER, OF COLUMBUS, OHIO, ASSIGNOR TO THE JAEGER MACHINE COMPANY, OF COLUMBUS, OHIO, A CORPORATION OF OHIO

CLUTCH

Application filed November 16, 1926. Serial No. 148,758.

This invention relates to clutches especially adapted for operably connecting a rotary driving member and a member to be driven. One object of the invention is to provide a clutching means in which the disengagement is effected with certainty and "sticking" avoided. Another object is to make such a device reversely operable—that is to say operable whether the driver turns to the right or left. Other objects can be gathered from the following description.

The invention is embodied in the example herein shown and described, the features of novelty being finally claimed.

In the accompanying drawing—

Figure 2:
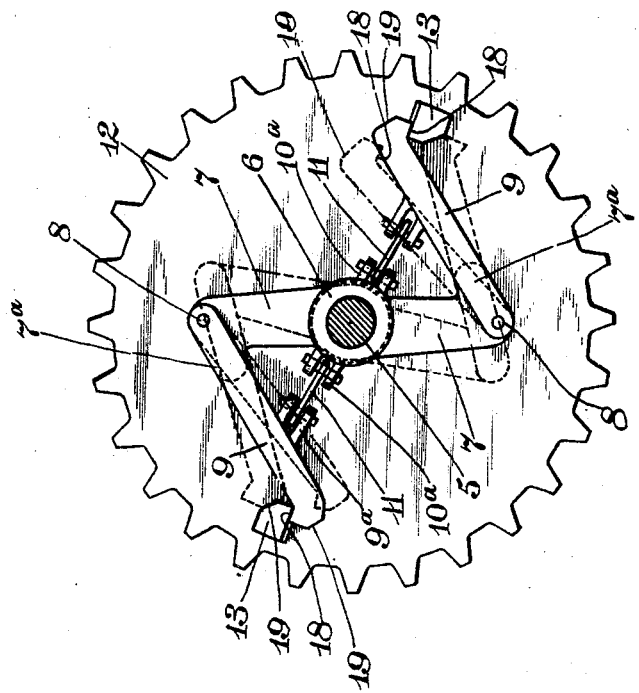
Fig. 2 is a view looking toward the right hand side of Fig. 1 with the parts not sectioned.

In the views the character 5 designates a shaft or driving member. Keyed by key $5^a$ on said shaft 5 is a hub 6 carrying two oppositely extending arms 7, 7 to the extremities of which are pivoted at 8 the bifurcate ends of clutch arms 9. These arms 9 each have two clutching faces at their free ends. Said arms 9 have perforated ears $9^a$. The character 10 designates an annularly grooved sleeve splined to and slidable on the shaft 5, said sleeve having diametrically opposite ears $10^a$. Pivotally connecting the ears $9^a$ and $10^a$ at opposite sides of the sleeve are links 11, 11 so that by sliding the sleeve on the drive shaft 5 the clutch arms are thrown inward or outward in a plane at right angles to the shaft according to the direction in which the sleeve is moved.

Turning loosely on the hub 6 is the driven member which, in the example shown, is a sprocket wheel 12. The wheel 12 is provided on its face next the arms 7, 7 with two substantially diametrically located stout lugs 13, 13, that extend into the path of the clutch heads of the arms 9, 9, the hub of the wheel 12 being secured from longitudinal movement on the hub 6 by means of a collar 14 and set screw 15.

The groove 16 of the sleeve 10 is engaged by the ordinary forked arm 17 for sliding the sleeve on the drive shaft.

Figure 1:
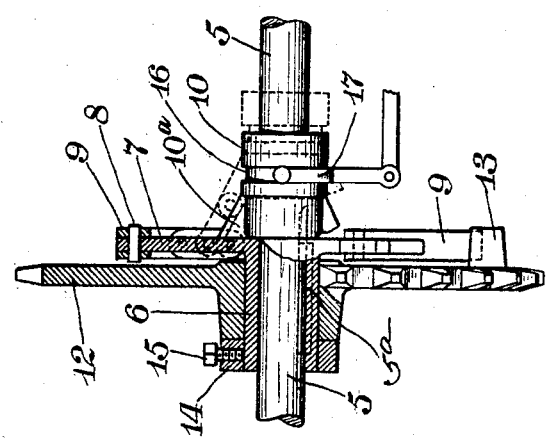
Figure 1 is a side view of the driving member showing the clutching device and driven member thereon partly in section.

The operation is this: When the shaft 5 is driven and it is desired that wheel 12 shall remain idle the sleeve 10 is moved away from the wheel 12 as shown by broken lines Fig. 1, thus keeping the arms 9 drawn inward in position where the clutch ends of those arms will pass the lugs 13, 13. Conversely when it is desired to drive the wheel 12 the sleeve 10 is moved toward the wheel, as shown by full lines Fig. 1, through the links 11, 11, shoving the arms 9 outward and the clutch heads of those arms into position to engage said lugs and therefore drive the wheel 12. The wheel 12 can be driven either to the right or the left, according to whether the shaft 5 is driven to the right or left. When driven to the right, as viewed in Fig. 2, the face 18 engages one side of the lug 13 and when driven to the left the face 19 engages the opposite side of said lug, as shown by one of the broken line positions. The other broken line positions show the arms 9 having their ends withdrawn from paths to engage the lugs 13 at either side. The engaging face 19 should be curved on an arc drawn from a circle having for its axis the pivot 8 and the face of the lug engaged by the face 19 should be similarly curved. It will be observed therefore that either of these clutch faces can be easily disengaged from the lugs.

In order to brace and prevent lateral wabbling of the arm 9 and hold the clutching head in operating line the end of the rigid arm 7 is angularly extended as seen at $7^a$ to lie well into the bifurcate pivoted end of said arm 9.

The forms of the parts can be changed without departing from the gist of the invention as claimed.

What I claim is:

1. A reversible clutch including a rotary drive member and a driven member, a lug on the driven member, and an arm pivoted on an axis at right angles to the plane of the driven member carried by the drive member swinging in the plane of the arm member and means sliding on the drive member linked to said arm to swing the latter into and out of the path of the lug on the driven member.

2. A clutch including a reversible rotary drive member and a driven member, a lug on the driven member and an arm fixed on the drive member, an arm pivoted to said fixed arm to swing in a plane parallel to the plane of the driven member, a sleeve turning with and sliding on the drive member, said pivoted arm having jaws to engage opposite sides of said lug, and means linking said pivoted arm to said sliding sleeve whereby said pivoted arm may be moved into or out of position to engage said lug for rotation of the driven member at either side of said lug according to the direction of rotation of said drive member.

GEBHARD JAEGER.